United States Patent
Nishio

(10) Patent No.: US 7,474,014 B2
(45) Date of Patent: Jan. 6, 2009

(54) SIGNAL TRANSMISSION METHOD

(75) Inventor: Haruhiko Nishio, Matsumoto (JP)

(73) Assignee: Fuji Electric Holdings Co., Ltd., Kawasaki-Shi, Kanagawa (JP)

( * ) Notice: Subject to any disclaimer, the term of this patent is extended or adjusted under 35 U.S.C. 154(b) by 357 days.

(21) Appl. No.: 11/492,064

(22) Filed: Jul. 25, 2006

(65) Prior Publication Data
US 2007/0030881 A1    Feb. 8, 2007

(30) Foreign Application Priority Data
Aug. 4, 2005    (JP) .............................. 2005-226989

(51) Int. Cl.
*H02J 1/00* (2006.01)
(52) U.S. Cl. .......................................... 307/4; 375/130
(58) Field of Classification Search .................. 307/4
See application file for complete search history.

(56) References Cited

FOREIGN PATENT DOCUMENTS

| JP | H04-287598 | 10/1992 |
|---|---|---|
| JP | 2005-033534 | 2/2005 |

OTHER PUBLICATIONS

CDMA Inter face Feb. 2000, pp. 59-74 Chapter 2.

*Primary Examiner*—Robert L. Deberadinis
(74) *Attorney, Agent, or Firm*—Manabu Kanesaka

(57) ABSTRACT

A data transmission method superimposes a spread code onto data in order to synthesize a first signal. The method changes the switching frequency of a switching power supply based on the first signal, transmitting the second signal to a plurality of semiconductor apparatuses (satellite apparatuses) via an output line of the switching power supply. The method changes the DC output voltage level of the second signal on the output line of the switching power supply wherein a satellite apparatus may use the second signal for controlling and instructing the satellite apparatuses to make the satellite apparatus shift, for example, from the stopped state or the sand-by mode to the normal operation mode so that the satellite apparatus may receive the first signal.

7 Claims, 12 Drawing Sheets

SIGNAL TRANSMISSION METHOD

BACKGROUND OF THE INVENTION

The present invention relates to a method for transmitting data to a semiconductor apparatus, the data operable to control the semiconductor apparatus.

FIG. 8 is a block diagram of a system in which a host CPU 50 controls at least one semiconductor apparatus. Host CPU 50 further controls a switch 51 to supply the output from a battery 52 to a power supply line 53. Host CPU 50 communicates with another host CPU 55 and a subsidiary CPU 56 via a signal line 54. Host CPU 50 transmits control data to a DC/DC converter control IC 57, a liquid crystal driver control IC 58, a RAM 59, a display control IC 60 and such a semiconductor apparatus to control the operations of the semiconductor apparatuses.

FIG. 9 is a block diagram of a system in which a power management controller 61 controls DC/DC converters. In FIG. 9, the same reference numerals as used in FIG. 8 are used to designate the same constituent elements and their duplicated explanations are omitted for the sake of simplicity. In FIG. 9, DC/DC converters 62 through 67 output respective voltages different from each other to the other semiconductor apparatuses. Power management controller 61 transmits control data to DC/DC converters 62 through 67 via signal line 54 to control the operations of DC/DC converters 62 through 67.

For the interface specifications for signal line 54 in FIGS. 8 and 9, the IIC, the Serial Peripheral Interface (SPI) and the micro-LAN interface have been proposed. However, it is necessary for the proposed interface specifications to employ an exclusive line for every kind of signal such as a clock (CLK) line, a data (D) line, a chip enable (CE) line, and a write/read (W/R) line.

Accordingly, it is unavoidable that hand held telephone sets and such electronic equipments, in which more and more semiconductor apparatuses have been used, require a greater wiring area on the printed circuit board for the above described exclusive signal lines.

Furthermore, because these signals utilize a single frequency, the proposed interfaces are adversely affected easily by noises, causing a low noise withstanding capability. Because the signal amplitude is the power supply voltage of the proposed interfaces, many radiated noise signals are generated, causing further hazards for down-sizing the hand held electronic equipments.

To increase an ability to withstand noise, a spread spectrum communication using a spread code sequence has been by proposed by Ryuji YOSHIMURA et. al., "CDMA Wired Interface," The Journal of the Institute of Electronics, Information and Communication Engineers, November 1999, Vol. J82-CII, No. 11, pp. 631-636, and Akihiko SUGIURA, Fundamentals of Spread Spectrum Technology and CDMA Communication Technology, Interface (a journal in Japanese), CQ Publishing Co., Ltd., February 2000, pp. 59-74.

Spread spectrum communication includes a spread code sequence that is a pseudo random number code sequence, i.e., a pseudo-noise (PN) code sequence, repeated at the period of the PN code length. The spread code sequence is characterized by the low correlation thereof with the other spread codes. Now the spread code length is assumed to be n bits. The n-bits data constituting spread codes PN1 and PN2 are designated by b11, b12, . . . , and b1$n$; and b21, b22, . . . , and b2$n$, respectively (b1$i$ and b2$i$ are 0 or 1). The correlation value of the spread codes PN1 and PN2 is defined by the sum of exclusive-ORs of b1$i$ and b2$i$ (0 when b1$i$ and b2$i$ are equal to each other and 1 when b1$i$ and b2$i$ are not equal to each other) over the i of 1 through n. When PN1=PN2, the correlation value is 0. When PN1=−PN2, the correlation value is n, wherein −PN2 is obtained by inverting 0 or 1 of the every bit b2$i$ of PN2. When PN1 and PN2 are different spread codes, the correlation value is n/2 or close to n/2. When the correlation value is 0 or n, the correlation is high. When the correlation value is n/2 or close to n/2, the correlation is low. The spread code sequence includes an M series and a Gold signal series. The circuit for generating the M series is obtained easily by using a shift register.

The communication system using the spread codes is described with reference to FIG. 10. In FIG. 10, data DATA1 to be transmitted and a spread code PN1 are shown. The spread code PN1 is a signal much faster than the data DATA1. The data DATA1 is modulated with the spread code PN1 and transmitted from a modulator 68.

In practice, modulator 68 calculates the exclusive-OR of the data DATA1 and the spread code PN1 to obtain data DATA2 and outputs the data DATA2. In the transmitted data DATA2, the portion thereof corresponding to the originally H portion of the data DATA1 is −PN1, and the portion thereof corresponding to the originally L portion of the data DATA1, is PN1.

In a demodulator 69, the transmitted data DATA2 is demodulated with the spread code PN1. In practice, the sum of the exclusive-ORs of the data DATA2 and each bit of the spread code is calculated. When the sum is equal to or higher than a first predetermined value, H is determined to be transmitted as data. When the sum is equal to or lower than a second predetermined value, it is determined that L is transmitted as data. When the sum is an intermediate value between the first and second predetermined values, it is determined that the data is not the ones transmitted to the relevant receiver.

As the foregoing descriptions on the correlation indicate, the data DATA1 to be transmitted is reproduced on the receiving side, when the same spread code PN1 is used on the transmitting and receiving sides. When different spread codes are used on the transmitting and receiving sides respectively, the data DATA1 to be transmitted is not reproduced on the receiving side. Thus, the receiving side determines whether the transmitted data is directed thereto or not with the spread code thereof.

In detail, when it is possible to demodulate the transmitted data DATA2 with the receiving side's own spread code, it is easily determined that the transmitted data DATA2 is directed to the relevant receiving side. When it is impossible to demodulate the transmitted data DATA2 with the receiving side's own spread code, it is easily determined that the transmitted data DATA2 is directed to the other receiving side. Because the spread spectrum communication calculates the sum for the spread code length, it is possible to reproduce the data DATA1, even if partial errors are caused in the transmitted data DATA2. Therefore, the spread spectrum communication is characterized by high noise withstanding capability.

However, because it is necessary for the wire communication interface using the code division multiple access (CDMA) described in the Non-patent Document 1 to employ three communication lines including two data lines and one clock line, the wide wiring area problem has not been solved.

For solving the wide wiring area problem, the present inventor has proposed, in Japanese Patent Application Publication No. 2005-33534, a signal transmission method that superimposes a spread code onto the data to be transmitted to prepare a signal and superimposes the prepared signal onto the power supply line to transmit the prepared signal. Now the signal transmission method proposed in the Patent Document 1 will be briefly described below.

FIG. 11 is a block circuit diagram describing the entire configuration of the data transmission system according to an embodiment disclosed in the Patent Document 1. In FIG. 11, a control circuit 1 incorporates therein a spread spectrum pulse width modulation (PWM) DC/DC converter that receives the output from a battery 2 and feeds a power supply voltage Vreg including the signals superimposed thereon to a power supply bus (an output line) 3. Control circuit 1 incorporates also a bus controller therein. Control circuit 1 also communicates with a host CPU. A second DC/DC converter control IC 4 for generating a 2.5 V power supply, a liquid crystal driver control IC 5, a display control IC 6 and a RAM 7 are connected to power supply bus 3. Between the semiconductor apparatuses described above and control circuit 1, a synchronization signal line 8 for transmitting a synchronization signal is connected. Through synchronization signal line 8, the signal for synchronizing with the data superimposed onto power supply bus 3 (e.g. the signal indicating the start of data transmission) is transmitted from control circuit 1 to the every semiconductor apparatus.

FIG. 12 is a block circuit diagram describing the entire configuration of the data transmission system according to another embodiment disclosed in the Patent Document 1. In FIG. 12, a control circuit 1A does not incorporate therein any bus controller but incorporates therein a power management controller. Liquid crystal driver control IC 5, display control IC 6 and RAM 7 in FIG. 11 are replaced by a third, fourth and fifth DC/DC converter control ICs 13, 14 and 15 in FIG. 12. In the circuit described in FIG. 12, the power management controller in control circuit 1A controls the DC/DC converter control ICs with the control signal superimposed on power supply bus 3.

The configuration example of the spread spectrum PWM DC/DC converter in FIGS. 11 and 12 is shown in FIG. 13. In FIG. 13, a P-type MOS transistor PMOS1, an N-type MOS transistor NMOS1, an inductor L, a capacitor CO, resistors R1 and R2, comparators CMP1 and CMP2, a reference voltage Vref, an oscillator circuit OSC and a driver circuit 10 constitute a usual step-down DC/DC converter of the synchronous commutation type. The source of P-type MOS transistor PMOS1 is connected to a power supply VDD (corresponding to the output of battery 2). The drain of P-type MOS transistor PMOS1 is connected to the drain of N-type MOS transistor NMOS1 and an end of inductor L. The source of N-type MOS transistor NMOS1 is connected to the ground potential (GND). The other end of inductor L is connected to an end of capacitor CO and an end of the series connection of resistors R1 and R2. The other end of inductor L works for an output feeder that feeds the regulated power supply voltage Vreg to power supply bus 3. The connection point of resistors R1 and R2 is connected to the inverting input terminal of comparator CMP1 for feeding a feedback signal Vfb for feeding back the output power supply voltage Vreg. A reference voltage Vref is connected to the non-inverting input terminal of comparator CMP1. Based on the result of comparing the feedback signal Vfb and the reference voltage Vref, an error signal Verr is outputted from comparator CMP1 to the non-inverting input terminal of comparator CMP2. A triangular wave Vosc outputted from oscillator circuit OSC is connected to the inverting input terminal of comparator CMP2. A driving signal Vdrv is outputted from comparator CMP2 based on the result of comparing the error signal Verr and the triangular wave Vosc and connected to driver circuit 10. Driver circuit 10 switches on and off transistors PMOS1 and NMOS1 to stabilize the output voltage Vreg so that the feedback signal Vfb may be equal to the reference voltage Vref.

If modulated data is produced by modulating the data to be transmitted with a spread code in the same manner as the transmitted (modulated) data DATA2 is produced from the data DATA1 to be transmitted and the spread code PN1 in FIG. 10 and the oscillation frequency (oscillation period) of oscillator circuit OSC is controlled based on the modulated data, the data may be transmitted at the switching frequency (switching period) of the DC/DC converter. The switching frequency is observed as a ripple component on power supply bus 3. On the receiving side shown in FIG. 14, the ripple component on power supply bus 3 is taken out with a capacitor C1 for cutting a DC component. The ripple component taken out is amplified with an amplifier AMP1 and demodulated with a demodulator circuit 12 using the spread code PN. When the correlation is high, the data directed to a semiconductor apparatus 11 on the receiving side is reproduced. When the correlation is low, it is determined that the transmitted data is directed to the other semiconductor apparatus. The demodulation results are transmitted to semiconductor apparatus 11. If the transmitted data is a control signal directed to semiconductor apparatus 11, semiconductor apparatus 11 conducts the operations instructed by the control signal.

Now the configuration of oscillator circuit OSC in FIG. 13 is described with reference to FIG. 15. Referring now to FIG. 15, oscillator circuit OSC includes constant current circuits 20, 21, 30, and 31; a P-type MOS transistor PMOS2; an N-type MOS transistor NMOS2; switches SW1 and SW2; a capacitor CT; comparators CMP3 and CMP4; reference voltages Vou and Vol; and a flip-flop FF1. The source of P-type MOS transistor PMOS2 is connected to constant current circuit 20 and to constant current circuit 21 via switch SW1. The source of N-type MOS transistor NMOS2 is connected to constant current circuit 30 and to constant current circuit 31 via switch SW2. The drains of MOS transistors PMOS2 and NMOS2 are connected to each other, to an end of capacitor CT, to the non-inverting input terminal of comparator CMP3 and to the inverting input terminal of comparator CMP4.

Because the output Q of flip-flop FF1 is connected to the gates of MOS transistors PMOS2 and NMOS2, MOS transistors PMOS2 and NMOS2 conduct operations supplementary to each other. The reference voltage Vou is connected to the inverting input terminal of comparator CMP3. The reference voltage Vol is connected to the non-inverting input terminal of comparator CMP4. The reference voltage Vou is higher than the reference voltage Vol. The output from comparator CMP3 is connected to the set input terminal S of flip-flop FF1. The output from comparator CMP4 is connected to the reset input terminal R of flip-flop FF1.

Because MOS transistors PMOS2 and NMOS2 operate in a manner supplementary to each other, capacitor CT is charged up solely by contact current circuit 20 or by constant current circuits 20 and 21 while P-type MOS transistor PMOS2 is ON, and the integral value of capacitor CT, i.e., the triangular wave output Vosc of the oscillator circuit, keeps rising.

While N-type MOS transistor NMOS2 is ON, capacitor CT is discharged solely by contact current circuit 30 or by constant current circuits 30 and 31 and the integral value of capacitor CT, i.e., the output Vosc of the oscillator circuit, keeps falling. As the output Vosc exceeds the reference voltage Vou to the higher side while the output Vosc is rising, the output from comparator CMP3 becomes H. As the output from comparator CMP3 becomes H, flip-flop FF1 is set such that the output Q thereof is H, N-type MOS transistor NMOS2 is switched on, and the output Vosc starts falling. As the output Vosc exceeds the reference voltage Vol to the lower side, the output from comparator CMP4 becomes H. As the output from comparator CMP4 becomes H, flip-flop FF1 is reset such that the output Q thereof is L, P-type MOS transistor PMOS2 is switched on, and the output Vosc starts rising again. Thus, the output Vosc of the oscillator circuit is a triangular wave oscillating between the reference voltages Vou and Vol.

The oscillation period of the triangular wave output Vosc depends on the constant current value, at which capacitor CT is charged and discharged. If the current value, at which capacitor CT is charged and discharged, is increased by switching on switches SW1 and SW2 such that the increased current value is higher than the current value in the standard state, in which switches SW1 and SW2 are OFF, the oscillation period will be shortened. If the constant current values that flow through constant current circuits 20, 21, 30, and 31 are designated by i20, i21, i30, and i31, it will be effective to set such that i20.i21 and i30.i31. By setting such that i20.i21 and i30.i31, the fundamental frequency is determined by i20 and i30 and the oscillation frequency will not deviate so much from the fundamental frequency, even if i21 and i31 are added.

If every bit of the transmitted (modulated) data obtained by modulating the data to be transmitted with a spread code is employed for a signal SEL for controlling switches SW1 and SW2 in such a manner that switches SW1 and SW2 are switched on and off in response to the L/H of the signal SEL, the switching period may be changed in response to the L/H of the transmitted data.

If switches SW1 and SW2 are switched on when the transmitted data bit is L and switched off when the transmitted data bit is H, the L/H of the bit will correspond to the short/long oscillation period, which will be superimposed onto the power supply line. These operations are described by the timing chart in FIG. 16. Alternatively, switches SW1 and SW2 may be switched on when the transmitted data bit is H and switched off when the transmitted data bit is L.

FIG. 16 shows signals for about three periods of the output Vosc of oscillator circuit OSC. The solid lines represent the signals, the periods thereof are long for the three periods of the oscillator output Vosc, for which switches SW1 and SW2 are OFF. The broken lines represent the signals, the periods thereof are short for the second period (second peak) of the oscillator output Vosc, for which switches SW1 and SW2 are ON.

The oscillator output Vosc is compared in comparator CMP2 with the error signal Verr from comparator CMP1 and the driving signal Vdrv, which is high when Verr>Vosc, is outputted from comparator CMP2. When the period of the oscillator output Vosc is long for all the three periods, that is all the corresponding three bits of the transmitted data are H, as described by the solid lines, the period of the driving signal Vdrv is long t0. When the second bit of the transmitted data is L as described by the broken lines, the period of the driving signal Vdrv is t1 or t2 shorter than t0. When the driving signal Vdrv is H, P-type MOS transistor PMOS1 in FIG. 13 is ON and the charging current iL for charging up capacitor CO increases. When the driving signal Vdrv is L, N-type MOS transistor NMOS1 in FIG. 13 is ON and the charging current iL for charging up capacitor CO decreases, resulting in the waveform iL shown in FIG. 16.

The average value of the load current fed to the load, not shown in FIG. 13, is designated by ioave. When iL>ioave, capacitor CO in FIG. 13 is charged up, raising the integral voltage value of capacitor CO. When iL<ioave, capacitor CO in FIG. 13 is discharged, lowering the integral voltage value of capacitor CO. Therefore, the regulated power supply voltage Vreg, the waveform thereof is shown in FIG. 16, is obtained.

The waveform of the regulated power supply voltage Vreg, shown in FIG. 16, is an observable ripple waveform. If described strictly, the Vreg waveform is not describable with straight lines. However, the Vreg waveform is described with straight lines for the sake of simplicity. When the period of the oscillator output Vosc is long for the three periods as described by the solid lines, the ripple period of the regulated power supply voltage Vreg is also t0. When the period of the oscillator output Vosc is short for the second period as described by the broken lines, the ripple period of the regulated power supply voltage Vreg is t3 or t4 shorter than t0. If demodulator circuit 12 in FIG. 14 determines the 0/1 of the transmitted data by monitoring the ripple signal period obtained through capacitor C1 and amplifier AMP1 and applies the spread code PN to the obtained result, it will be possible for demodulator circuit 12 to determine whether the transmitted signal is directed thereto or not and to demodulate the data directed thereto.

Because it is possible for the relevant receiver to determine whether data is directed thereto or not based on the data superimposed on the power supply as described above, the data line and the chip enable (CE) line, become unnecessary and the wring area may be reduced. Because data is transmitted in the form of ripples and because the ripple amplitude is not large, radiation noises caused by data transmission may be reduced. Because the modulated data is determined by the correlation between a plurality of transmitted data bits and a plurality of spread code bits, a high noise withstanding capability is obtained.

According to the invention disclosed in Japanese Patent Application Publication No. 2005-33534, spread codes are superimposed on the data to be transmitted and the switching period of the switching power supply is changed based on the modulated data such that the data may be transmitted to a plurality of semiconductor apparatuses via a power supply bus as described above. Therefore, the wiring for transmitting data and the wiring for selecting the semiconductor apparatuses, to which the data is directed, may be omitted.

According to the invention disclosed in Japanese Patent Application Publication No. 2005-33534, the data is transmitted in the form of ripples on the power supply bus and the period of the ripples is varied so that the ripples may not be localized at a certain frequency, electromagnetic interference (EMI) is reduced very effectively. Because the spread code is employed, signal transmission quite immune to noises is realized according to the invention disclosed in the Patent Document 1.

Japanese Patent Application Publication No. Hei. 4 (1992)-287598 (Paragraph [0026], FIG. 2) discloses a data transmission method, which sets two output voltage levels, one of which is high and the other one of which is low, on a power supply output line, changes the output voltage level every unit period of around 100 µs, and transmits a signal sequence via the output line. (If the unit period is set at 100 µs, the voltage level is high for the initial 300 µs, and the voltage level is low for the subsequent 200 µs, then the binary data 11100 will be transmitted.)

Although the data transmission method according to the invention disclosed in the Patent Document 1 has various specific features as described above, some problems remain unsolved if the current consumption thereof is considered.

The shift from the stopped state or the stand-by state to the operating state by the command from the host apparatus in the system shown in FIG. 11 or 12 (control circuit 1 in FIG. 11 or control circuit 1A in FIG. 12) will be considered. It is necessary to make demodulator circuit 12 always work so that the satellite apparatus (second DC/DC converter control IC 4, liquid crystal driver control IC 5, display control IC 6 and RAM 7 in FIG. 11 or second, third, fourth and fifth DC/DC converter control ICs 4, 13, 14 and 15 in FIG. 12) may always receive the signal sent from the host apparatus.

Because the clock signal is necessary for making demodulator circuit 12 always work, it is necessary to make the oscillator (not shown) for generating a clock signal always work. Therefore, it is impossible to suppress the current consumption caused by the oscillator circuits and demodulator circuits 12 in the satellite apparatus, irrespective of whether the satellite apparatuses are in the stopped state or the stand-by state.

Because the data transmission system disclosed in Japanese Patent Application Publication No. Hei. 4 (1992)-287598 (Paragraph [0026], FIG. 2) changes the output voltage depending on the response of the power supply, it is impossible to realize high-speed communication. If the level difference is small, the system is easily adversely affected by noise. If the level difference is large, large EMI is caused.

For receiving data, it is necessary for the satellite apparatuses to install an oscillator in the same manner as in the system disclosed in the Patent Document 1. Therefore, it is impossible, for the data transmission system disclosed in the Patent Document 2, to suppress the current consumption of the oscillator circuits and demodulator circuits 12 in the satellite apparatuses.

In view of the foregoing, it would be desirable to provide a signal transmission method that facilitates obviating the problems described above.

It would be also desirable to provide a signal transmission method that facilitates exhibiting the specific features (merits) disclosed in the above cited Japanese Patent Application Publication No. 2005-33534 and suppressing the power consumption in the stopped state or in the sand-by state.

SUMMARY OF THE INVENTION

According to one aspect of the invention, there is provided a signal transmission method using a switching power supply including switching devices, the method including: modulating the switching frequency of the switching devices with a first signal to superimpose the first signal onto the output line of the switching power supply; and changing the voltage level on the output line of the switching power supply to transmit a second signal via the output line of the switching power supply.

According to another aspect, the first signal is not superimposed onto the output line of the switching power supply when the voltage level on the output line is at a predetermined value or in a predetermined range.

According to another aspect, the first signal is generated by superimposing a spread code onto the signal to be transmitted.

According to another aspect, the switching frequency is determined by an oscillator circuit that charges and discharges a capacitor between predetermined voltage values with a constant current and the constant current value is changed by continuous m (a nonnegative integer) bits in the signal obtained by superimposing the spread code onto the signal to be transmitted.

Furthermore, according to another aspect, the switching power supply is a first DC-DC converter.

In addition, another aspect includes a second DC-DC converter connected to the output line of the switching power supply, and the first and second signals are used to control the second DC-DC converter.

According to another aspect, a synchronization signal for synchronizing the second signal superimposed onto the output line of the switching power supply is transmitted via a signal line different from the output line of the switching power supply.

The signal transmission method according to the invention superimposes a spread code onto an original signal (data to be transmitted) to synthesize a first signal, changes the switching frequency of a switching power supply based on the first signal to transmit the first signal to a plurality of semiconductor apparatuses (satellite apparatuses) via the output line of the switching power supply, and changes the output voltage level on the output line to transmit a second signal to the satellite apparatuses. By using the second signal for controlling and instructing the satellite apparatuses, the satellite apparatuses are shifted, for example, from the stopped state or the sand-by mode to the normal operation mode so that the satellite apparatuses may receive the first signal. Because the voltage level on the output line is monitored by a static means that does not employ any clock signal, the power consumption in the satellite apparatuses in the stopped state or in the sand-by mode is reduced. It is possible to omit the wiring for selecting the data to be transmitted and the satellite apparatus, to which the data is directed, in the same manner as the signal transmission method disclosed in the Patent Document 1. Because the data is transmitted in the form of ripples on the power supply bus and the period thereof is changed so that the ripple frequency may not be localized to a certain frequency, the EMI is reduced very effectively. Because the spread code is employed, data transmission quite immune to noises is realized.

DETAILED DESCRIPTION OF PREFERRED EMBODIMENTS

The invention will be described in detail hereinafter with reference to the accompanied drawings which illustrate the preferred embodiments of the invention.

First Embodiment

Figure 11:
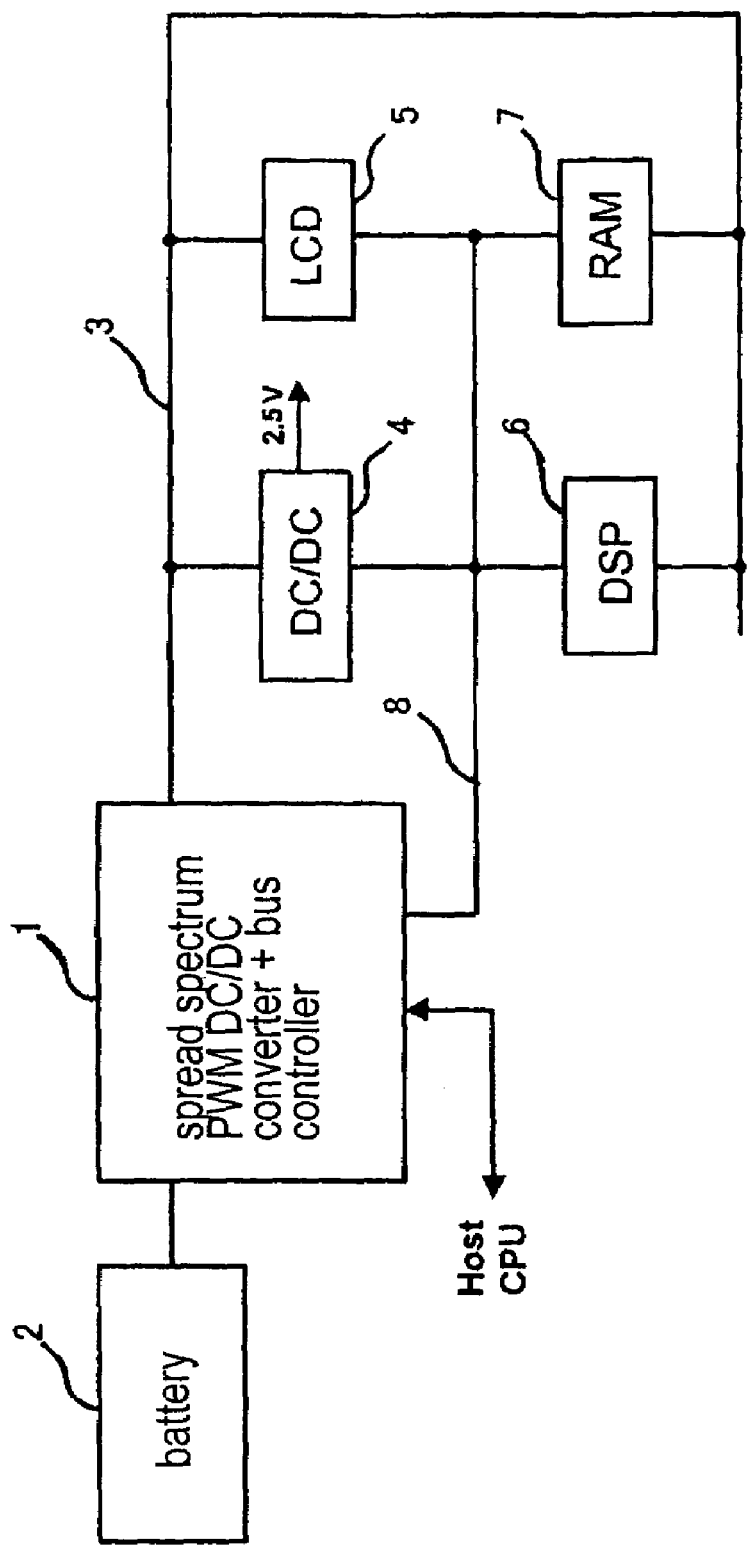
FIG. 11 is a block circuit diagram illustrating a data transmission system according to the prior art, common to the configuration of an embodiment of the invention.
Figure 12:
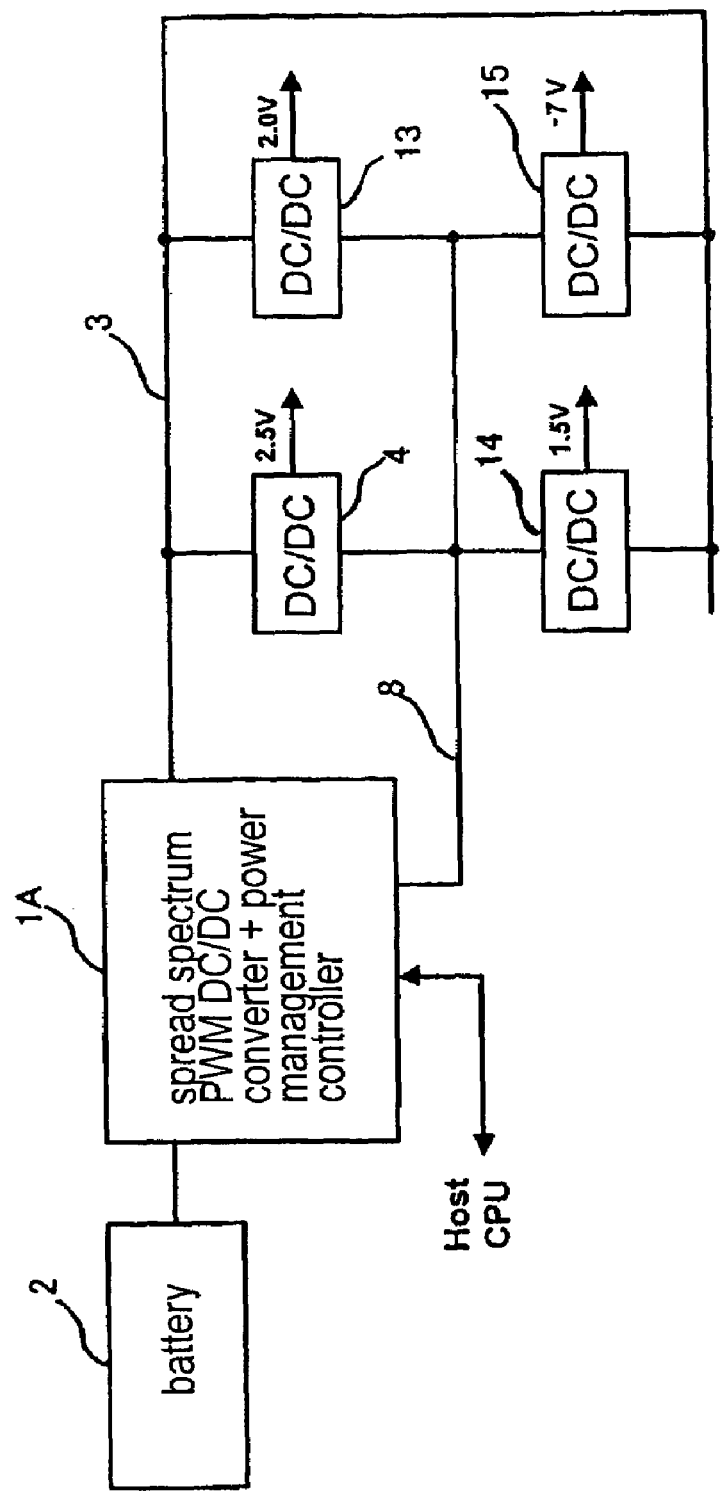
FIG. 12 is a block circuit diagram illustrating a data transmission system according to another prior art, common to the configuration of another embodiment of the invention.

Although the block diagram showing the entire system configuration according to a first embodiment of the invention is the same as those illustrated in FIGS. 11 and 12, the configurations of the host and satellite apparatuses are different.

Figure 1:
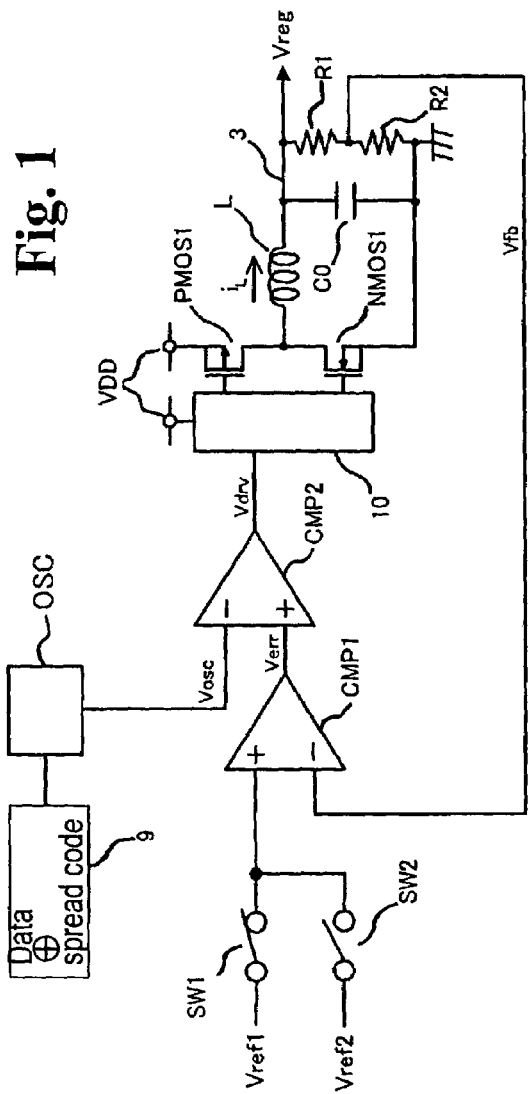
FIG. 1 is a block circuit diagram of a spread spectrum PWM DC/DC converter according to one embodiment of the invention.

FIG. 1 is a block circuit diagram of a spread spectrum PWM DC/DC converter for the system described in FIGS. 11 and 12 and for the data transmission method according to the first embodiment of the invention. In FIG. 1, the same reference numerals and symbols as used in FIG. 13 are used to designate the same constituent elements and their duplicated descriptions are omitted for the sake of simplicity.

Figure 13:
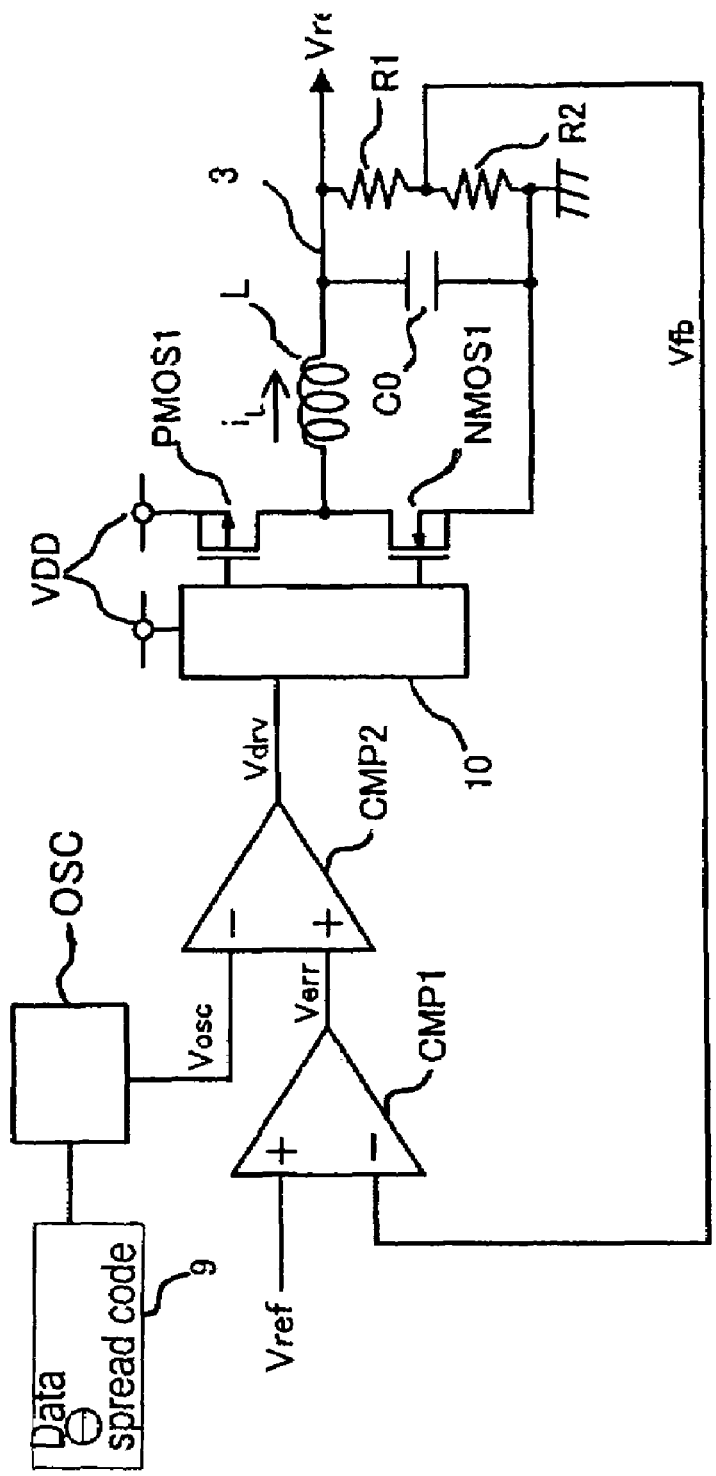
FIG. 13 is a block circuit diagram of the spread spectrum PWM DC/DC converter disclosed in Japanese Patent Application Publication No. 2005-33534.

Referring to FIG. 1, the PWM DC/DC converter according to the first embodiment is different from the PWM DC/DC converter shown in FIG. 13 in that the non-inverting input terminal of comparator CMP1 in FIG. 1 is connected to reference voltages Vref1 and Vref1 via switches SW1 and SW2, respectively. Switches SW1 and SW2 are ON and OFF exclusively (when one of them is ON, the other one is OFF, and vice versa). The ON and OFF of switches SW1 and SW2 are controlled, for example, by a host CPU.

Because the DC/DC converter operates such that the non-inverting and inverting input terminals of comparator CMP 1 are short-circuited virtually, the output voltage Vreg is Vref1·(R1+R2)/R2 when the reference voltage connected to the non-inverting input terminal of comparator CMP 1 is Vref1 or Vref2·(R1+R2)/R2 when the reference voltage connected to the non-inverting input terminal of comparator CMP 1 is Vref2.

According to the first embodiment, the reference voltages Vref1 and Vref2 are set so that the output voltage Vreg may be set to 2.2 V and 2.5 V, respectively. When the host apparatus wants to make the satellite apparatus conduct the normal mode of operations, the host apparatus selects Vref1 for the reference voltage. When the host apparatus wants to bring the satellite apparatus into the stopped state or the stand-by mode, the host apparatus selects Vref2 for the reference voltage.

The satellite apparatuses monitor the output voltage Vreg. The satellite apparatuses stop the oscillators thereof when the output voltage Vreg is 2.5 V. The satellite apparatus make the oscillators thereof work as soon as the output voltage Vreg shifts to 2.2 V.

Figure 2:
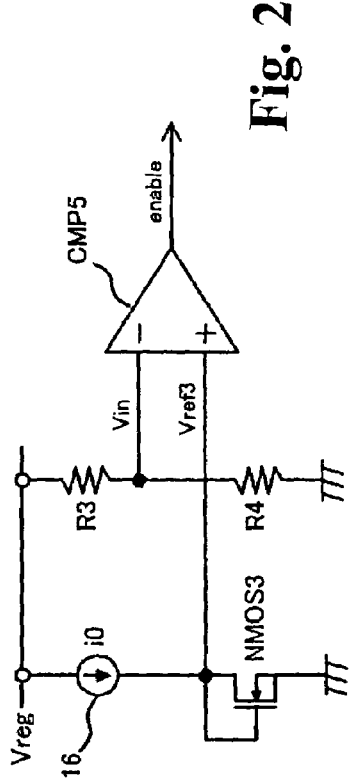
FIG. 2 is a block circuit diagram describing the fundamental configuration of an output voltage determination circuit in a satellite apparatus for determining the output voltage Vreg according to the apparatus of FIG. 1.

FIG. 2 is a block circuit diagram describing the fundamental configuration of an output voltage determination circuit in a satellite apparatus for determining the output voltage Vreg. Resistors R3 and R4 are voltage dividers that divide the output voltage Vreg to generate a signal Vin. The signal Vin is inputted to the inverting input terminal of a comparator CMP5. A constant current supply 16 and an N-type MOS transistor NMOS3, in a diode connection, constitute a reference voltage generator circuit. Because the voltage-current characteristics of N-type MOS transistor NMOS3 in a diode connection exhibit square-law characteristics, the voltage that makes the constant current i0 fed from constant current supply 16 flow to N-type MOS transistor NMOS3 is a reference voltage Vref3.

The reference voltage Vref3 is generated at the connection point of constant current supply 16, the drain of N-type MOS transistor NMOS3 and the gate of N-type MOS transistor NMOS3. The reference voltage Vref3 is connected to the non-inverting input terminal of comparator CMP5. Comparator CMP5 compares the signal Vin and the reference voltage Vref3 and generates an enable signal that instructs the normal mode of operations to the satellite apparatuses. When Vin>Vref3, the enable signal=L (low).

In response to the L enable signal, the satellite apparatus determines that the output voltage Vreg is 2.5 V and brings itself into the stopped sate or the stand-by mode. When Vin<Vref3, the enable signal=H (high). In response to the H enable signal, the satellite apparatus determines that the output voltage Vreg is 2.2 V and brings itself into the normal operation mode.

Figure 3:
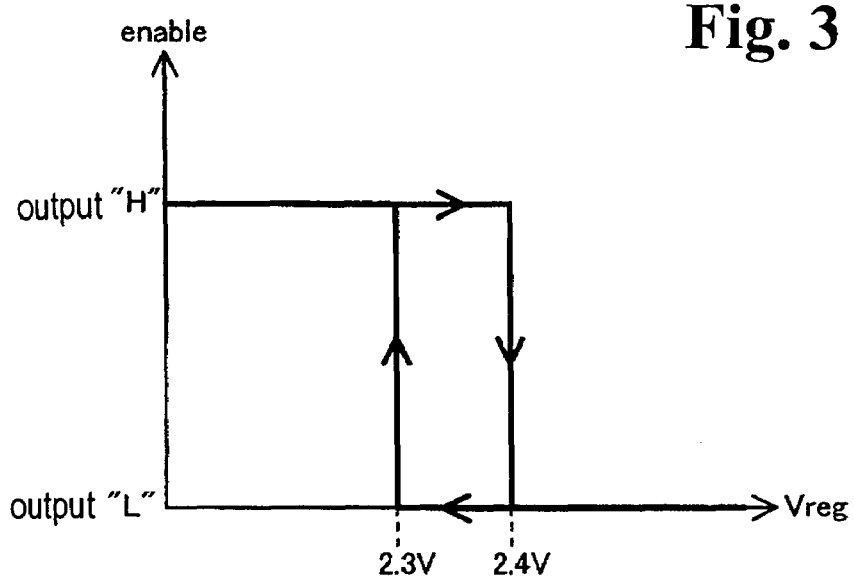
FIG. 3 illustrates exemplary hysteresis characteristics exhibited by the output voltage determination circuit of FIG. 2.
Figure 4:
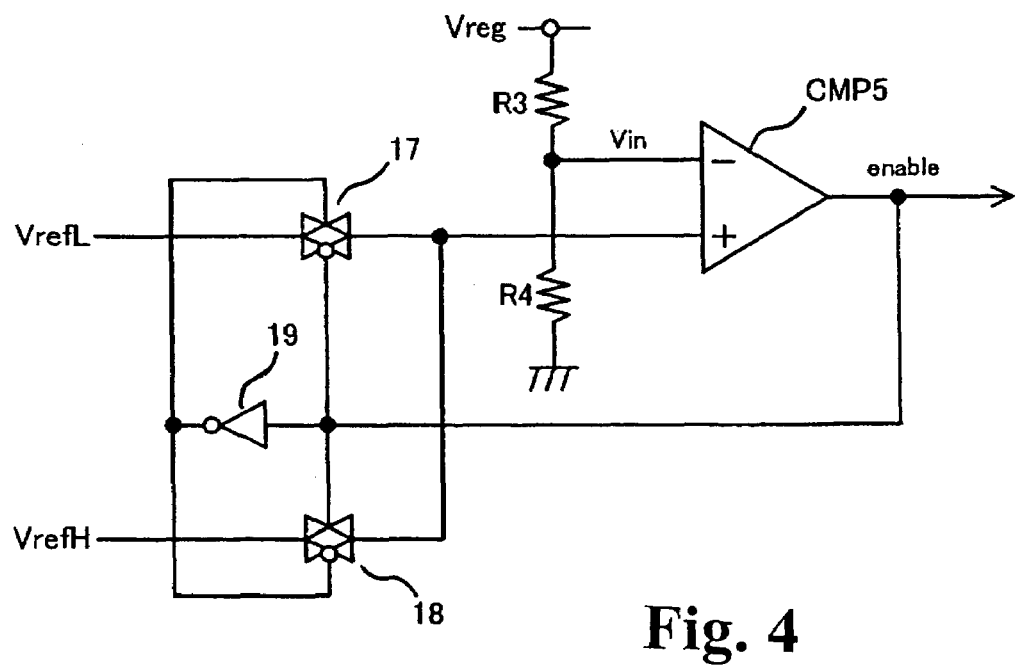
FIG. 4 is a block circuit diagram of an output voltage determination circuit for determining the output voltage Vreg provided with preferable hysteresis characteristics according to FIG. 3.

In practice, it is preferable to provide the circuit for determining the output voltage Vreg with hysteresis characteristics as shown in FIG. 3. FIG. 4 is a block circuit diagram of an output voltage determination circuit provided with preferable hysteresis characteristics. In FIG. 4, the same reference numerals as used in FIG. 2 are used to designate the same constituent elements and their duplicated explanations are omitted for the sake of simplicity. The output voltage determination circuit in FIG. 2 is provided with one reference voltage Vref3.

In contrast, the output voltage determination circuit in FIG. 4 changes over two reference voltages VrefL and VrefH (VrefL<VrefH) with two transmission gates 17 and 18. Transmission gates 17 and 18 are controlled with the output of comparator CMP5 and the signal obtained by inverting the output of comparator CMP5 with an inverter 19. Because transmission gate 17 is ON and transmission gate 18 is OFF when the enable signal=L, the reference voltage for the determination circuit is set at VrefL. As the output voltage Vreg lowers later such that Vin<VrefL, the enable signal becomes H, transmission gate 17 becomes OFF and transmission gate 18 becomes ON, setting the reference voltage for the determination circuit at VrefH.

As the output voltage Vreg rises in this state such that Vin>VrefH, the enable signal becomes L, transmission gate 17 becomes ON and transmission gate 18 becomes OFF, setting the reference voltage for the determination circuit again at VrefL.

The reference voltages VrefL and VrefH may be formed by a combination of a constant current supply and an N-type MOS transistor in the same manner as the reference voltage Vref3 in FIG. 2 or by a band gap reference circuit and such an appropriate means. The reference voltages VrefL and VrefH may be set at 2.2×R3/(R3+R4) and 2.4×R3/(R3+R4), respectively, corresponding to the hysteresis characteristics described in FIG. 3.

According to the first embodiment, the satellite apparatus monitors the output voltage Vreg and determines whether the satellite apparatus is instructed to be in the normal operation mode, in the stopped state or in the stand-by mode. Because the oscillator circuit in the satellite apparatus is stopped in the stopped state or in the stand-by mode, the current consumption is suppressed.

Only the circuit for determining the output voltage Vreg is operating in the stopped state or in the stand-by mode in the satellite apparatus. Although the operating oscillator circuit consumes the current of around several hundreds µA, the current consumption in the circuit for determining the output voltage Vreg may be reduced to approximately several µA, because it is not necessary for the output voltage determination circuit to operate at a high-speed. Thus, the current consumption in the stopped state or in the stand-by mode is reduced greatly according to the first embodiment.

Because the signal indicating the normal or other modes of operations, as well as all the other data are transmitted through the output line of the switching power supply, the wiring for transmitting signals and the wiring for transmitting data is not required.

Although the descriptions have been made in connection with the high output voltage Vreg for the stopped state and the sand-by mode and the low output voltage Vreg for the normal mode of operations, the high output voltage Vreg may be assigned for the normal mode of operations and the low output voltage Vreg for the stopped state and the sand-by mode.

Furthermore, although the values of the output voltage Vreg are set at 2.2 V and 2.5 V in the above descriptions, the output voltage Vreg may be set at the other values.

To make it easier for the satellite apparatus to distinguish between the two output voltages Vreg's, it is preferable to widen the difference between the output voltages within an available range, in which the satellite apparatus can operate.

Second Embodiment

Figure 15:
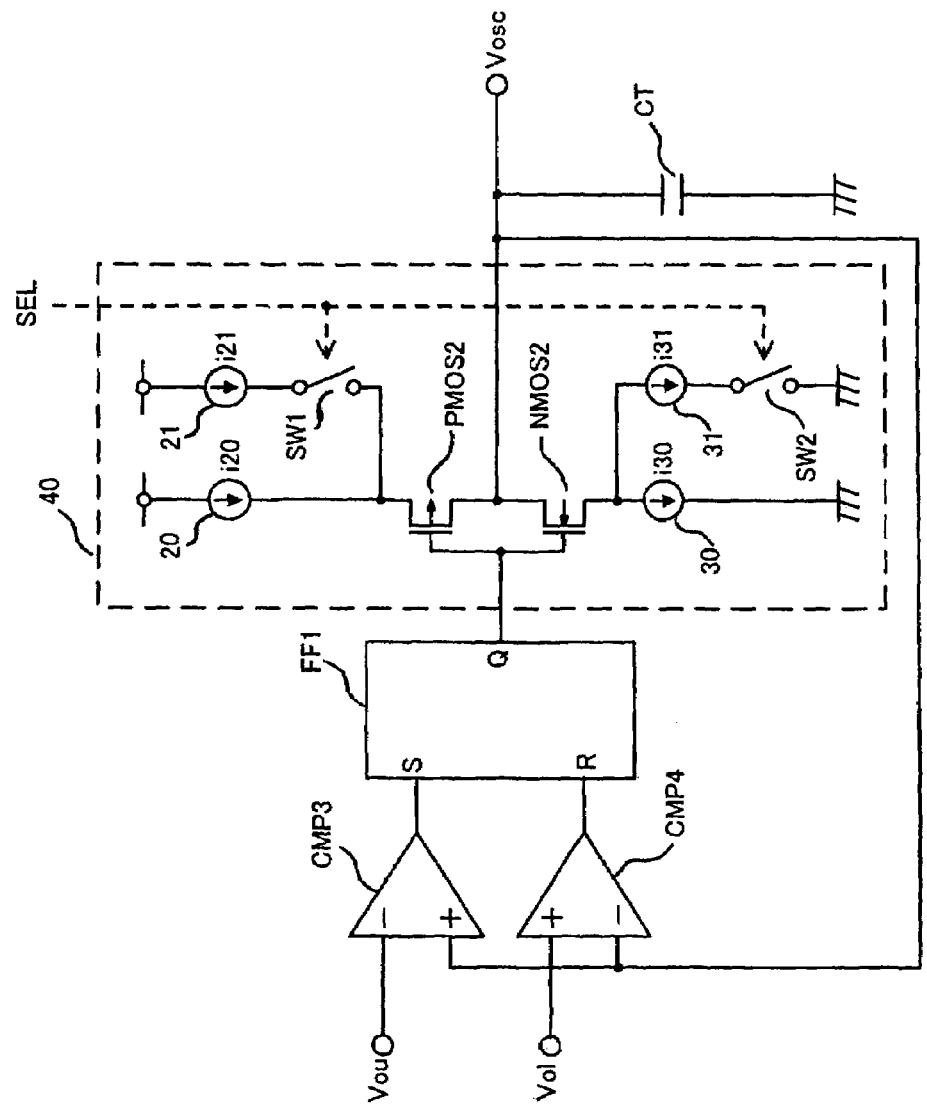
FIG. 15 is a block circuit diagram of the oscillator circuit disclosed in the Japanese Patent Application Publication No. 2005-33534.

Because the signal transmission method according to the first embodiment is based on the use of the oscillator circuit described in FIG. 15, it is impossible for the signal transmission method according to the first embodiment to transmit two or more bits for one oscillation period of oscillator circuit OSC.

Figure 5:
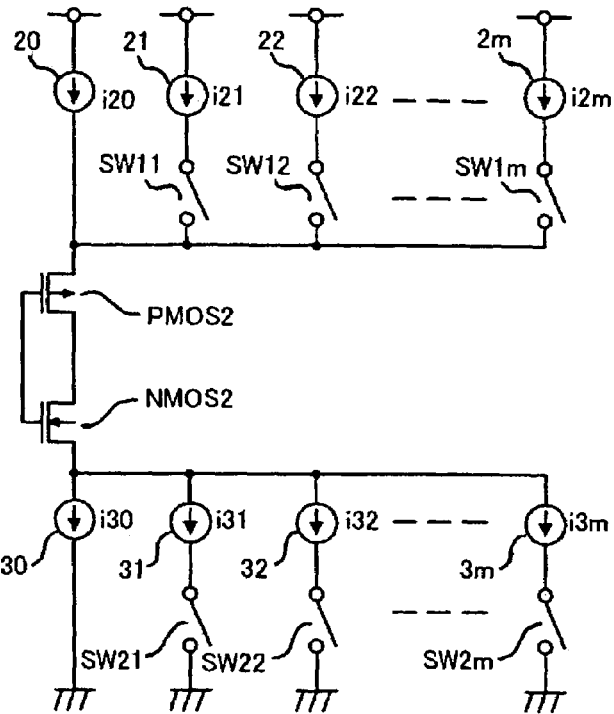
FIG. 5 is a block circuit diagram of a circuit determining the oscillation period of the oscillator circuit according to a second embodiment of the invention.

A signal transmission method according to a second embodiment that facilitates transmitting m bits every oscillation period of oscillator circuit OSC, is described below. The data to be transmitted is divided into data sections of m bits and the oscillation period of oscillator circuit OSC is determined by the m-bits data. FIG. 5 illustrates a circuit for generating an oscillation period in oscillator circuit OSC.

The circuit shown in FIG. 5 replaces the circuit block 40 surrounded by the broken lines in FIG. 15. In FIG. 5, the same reference numerals and symbols as used in FIG. 15 are used to designate the same constituent elements and their duplicated descriptions are omitted for the sake of simplicity.

Referring now to FIG. 5, constant current circuits 22 through 2$m$, and 32 through 3$m$, and switches SW22 through SW2$m$, and SW32 through SW3$m$ are added to the circuit block 40 in FIG. 15, respectively. Switches SW11 and SW21 in FIG. 5 correspond to SW1 and SW2 in FIG. 15.

If the current values i2$j$ and i3$j$ flowing through constant current circuits 2$j$ and 3$j$ (j=2, ..., and m) are adjusted such that i2$j$=j21×(1/2)j−1 and i3$j$=j31×(1/2)j−1, and the ON/OFF of switches SW1$k$ and SW2$k$ is determined by the L/H of the bit b$k$ (k=1, ..., and m), which is the kth bit of the m bits, such that switches SW1$k$ and SW2$k$ are ON for the L of the bit b$k$ and OFF for the H of the bit b$k$, or vice versa, then the current for charging and discharging capacitor CT will be changed in 2 m ways by the m-bits data.

Figure 16:
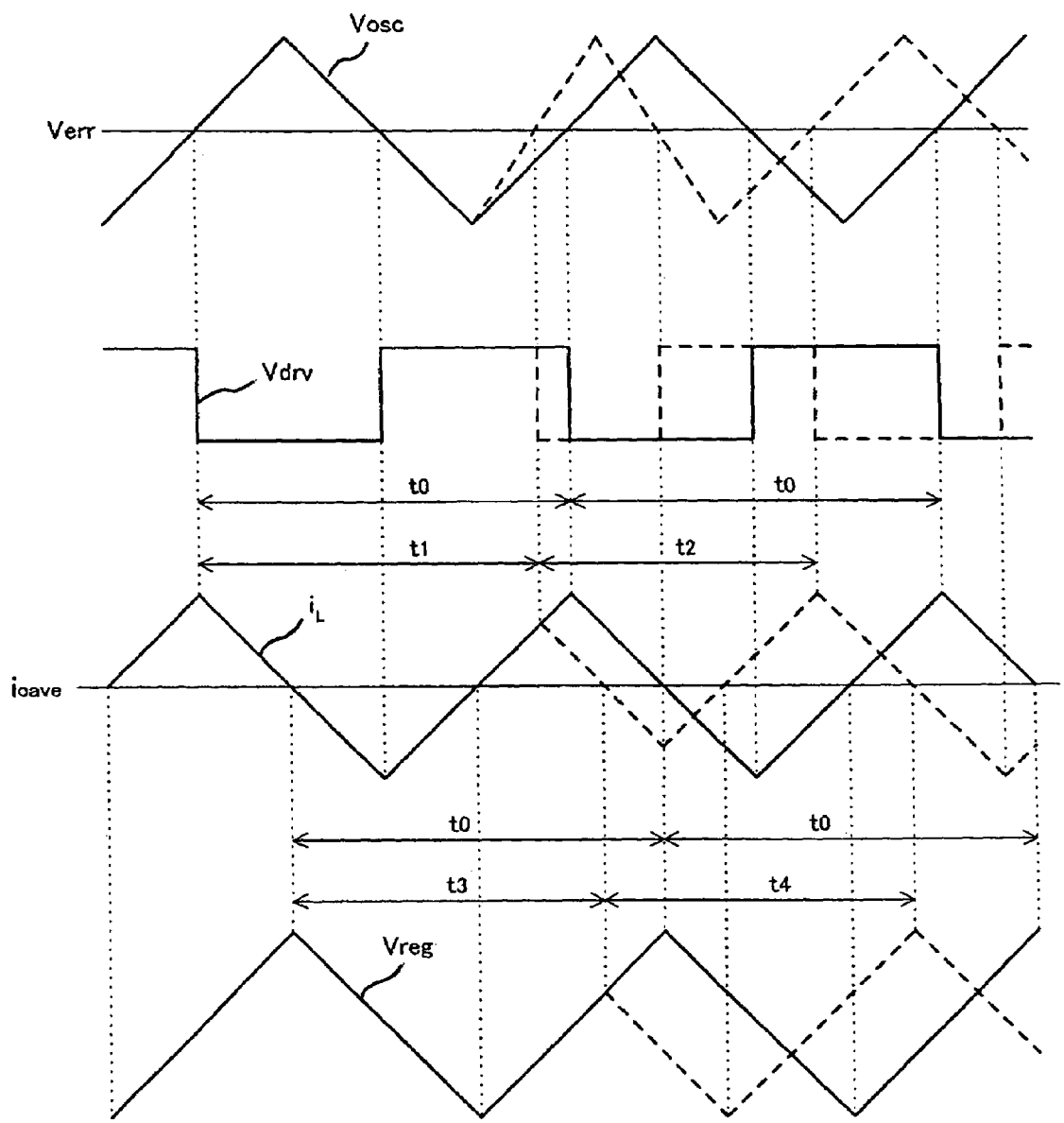
FIG. 16 is a timing chart describing the operations of the oscillator circuit disclosed in Japanese Patent Application Publication No. 2005-33534.

By virtue of the charging and discharging current that changes in 2m ways, the ripple period of the power supply voltage may be changed more minutely than t0, t3 and t4 in FIG. 16 or more ripple variations are obtainable. In other words, the transmissible data amount is increased.

Figure 14:
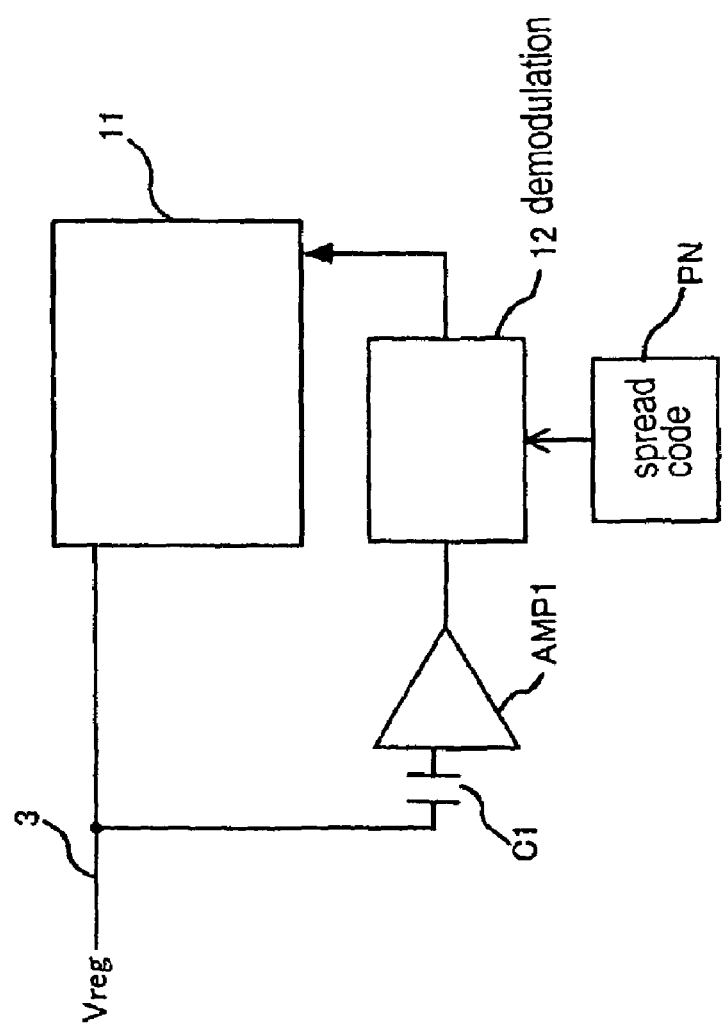
FIG. 14 is a block circuit diagram showing the configuration on the receiving side disclosed in Japanese Patent Application Publication No. 2005-33534.

FIG. 14 illustrates a more complicated circuit for detecting an increased amount of data with greater sensitivity. A tradeoff exists between the amount of data to be transmitted and the complexity of the demodulator, and may be resolved based upon the specific application to which the present invention is applied.

Third Embodiment

Figure 6:
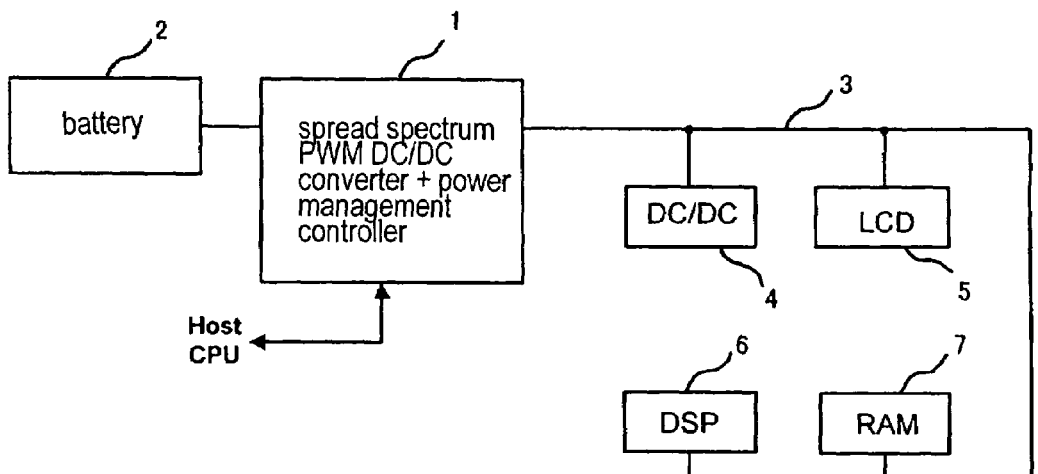
FIG. 6 is a block circuit diagram of a data transmission system according to a third embodiment of the invention.

FIG. 6 is a block circuit diagram describing the configuration of a data transmission system according to a third embodiment of the invention. The circuit shown in FIG. 6, similar to that of FIG. 11, omits signal line 8, operable to transmit the synchronization signal. Because signal line 8 is omitted, the wiring area required for synchronization signal line 8 is unnecessary according to the third embodiment.

However, because the data transmission system according to the third embodiment is not provided with any synchronization signal line, it is necessary to include a synchronization supplementing circuit on the receiving side (cf. Non-patent Document 2), thereby increasing the circuitry, and therefore the area of circuit layout area, for the receiving side.

Although a tradeoff relation exists between the wiring area saved and the extra circuit layout area needed, the question of whether greater importance is attached to the wiring area or to the circuit layout area may be answered considering the situation to which the present invention is applied.

Fourth Embodiment

Figure 7:
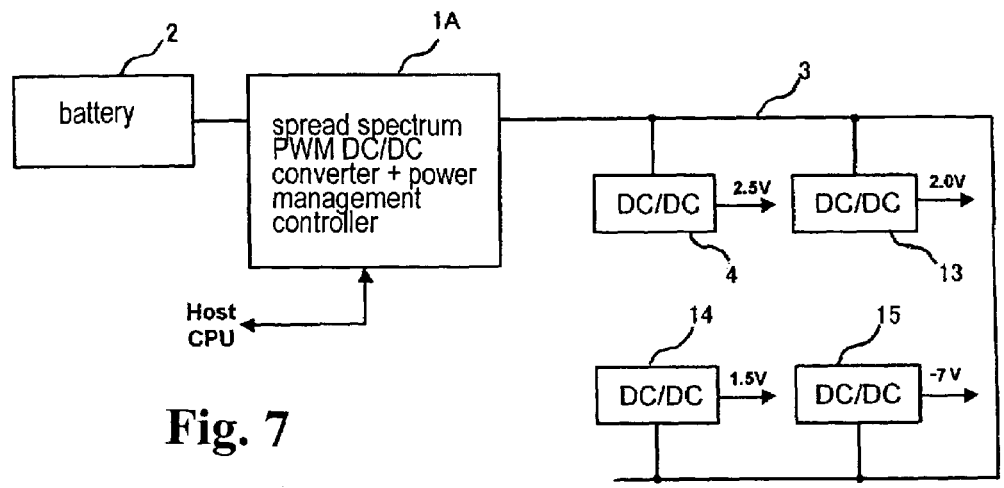
FIG. 7 is a block circuit diagram of a data transmission system according to a fourth embodiment of the invention.
Figure 8:
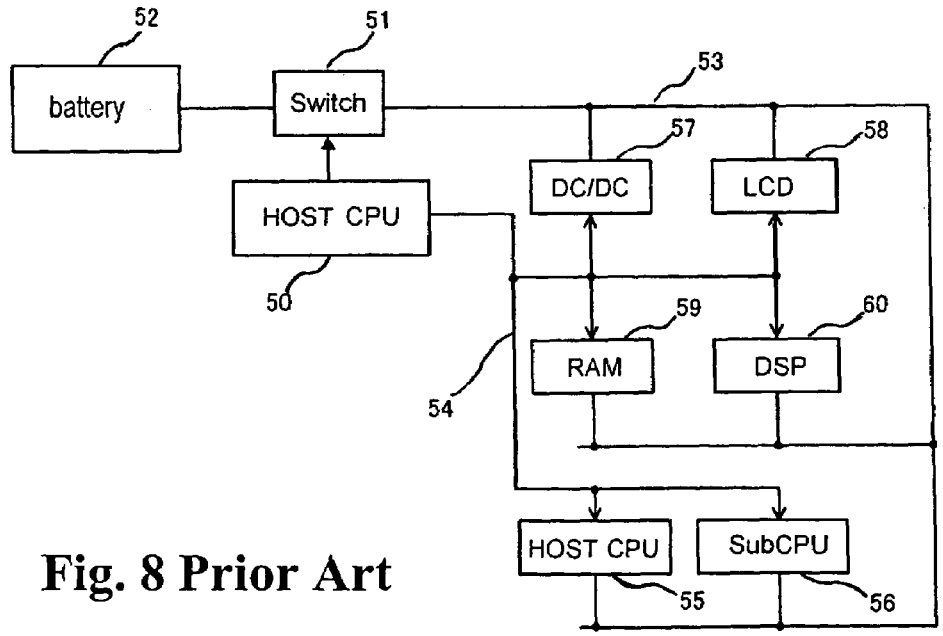
FIG. 8 is a block diagram of a conventional data transmission system, in which a host CPU controls semiconductor apparatuses.
Figure 9:
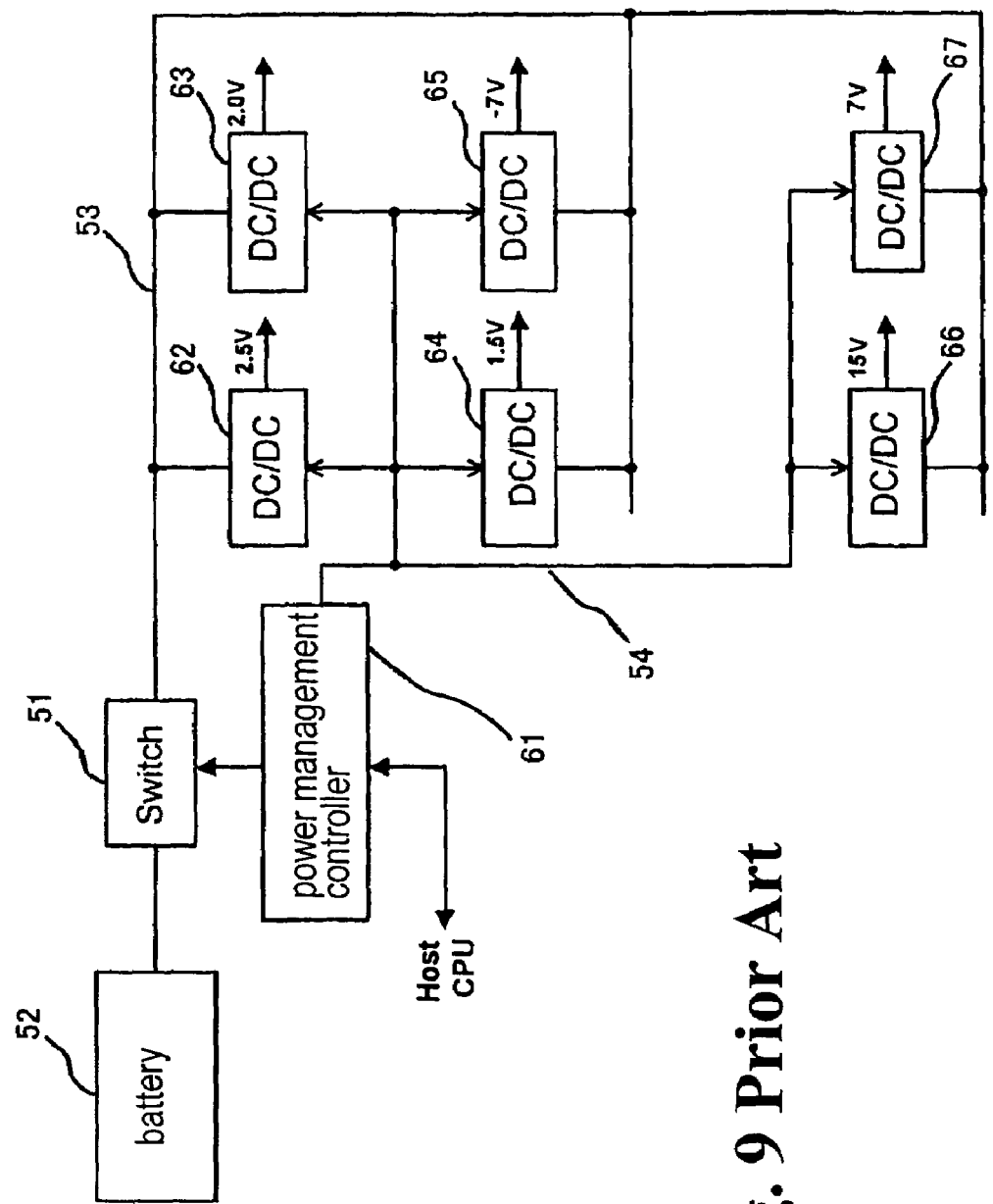
FIG. 9 is a block diagram of another conventional data transmission system, in which a power management controller controls DC/DC converters.
Figure 10:
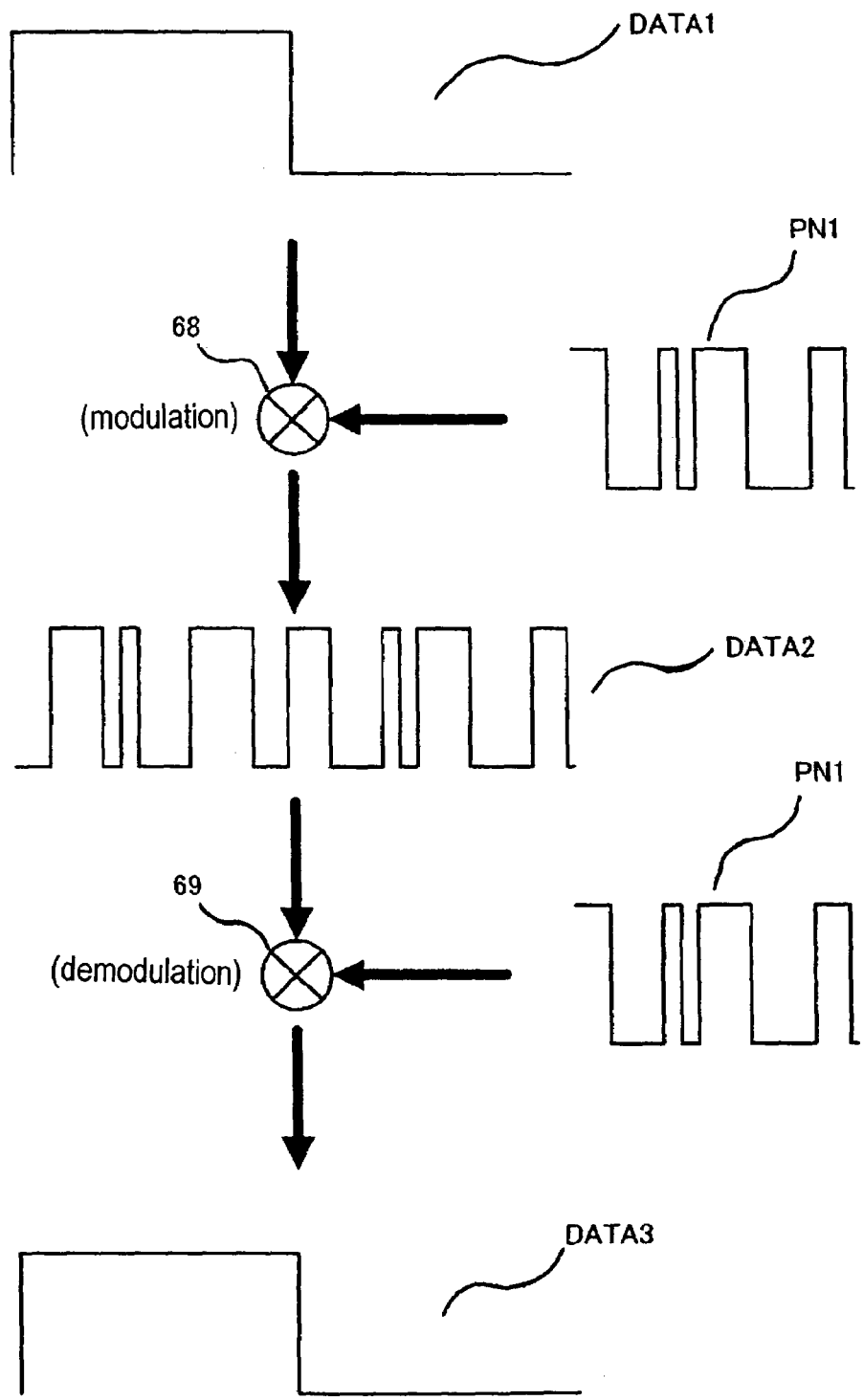
FIG. 10 illustrates the communication principle using spread codes.

FIG. 7 is a block circuit diagram describing the data transmission system according to a fourth embodiment of the invention. The circuit shown in FIG. 7 is configured by omitting signal line 8 for transmitting synchronization signal from the circuit shown in FIG. 12.

Although the wiring area is reduced according to the fourth embodiment, the circuit scale is increased on the receiving side due to the provision of the synchronization supplementing circuit. In other words, the circuit layout area is increased.

A tradeoff relation exists between the wiring area and the circuit layout area in the data transmission system according to the fourth embodiment. Whether greater importance is attached to the wiring area or to the circuit layout area is a question that may be determined based upon the specific situation in which the present invention is applied.

The disclosure of Japanese Patent Application No. 2005-226989 filed on Aug. 4, 2005 is incorporated herein as a reference.

While the invention has been explained with reference to the specific embodiments of the invention, the explanation is illustrative, and the invention is limited only by the appended claims.

What is claimed is:

1. A signal transmission method, comprising:
    modulating a switching frequency of a switching device with a first signal;
    superimposing the first signal onto an output line of a switching power supply; and
    changing a voltage level on the output line of the switching power supply, thereby transmitting a second signal via the output line of the switching power supply.

2. The signal transmission method according to claim 1, wherein superimposing the first signal onto the output line of the switching power supply is based upon at least one of a predetermined voltage level on the output line and within a predetermined voltage range.

3. The signal transmission method according to claim 1, further comprising superimposing a spread code onto a signal to be transmitted to generate the first signal.

4. The signal transmission method according to claim 3, wherein the switching frequency is determined by an oscillator circuit that charges and discharges a capacitor between predetermined voltage values with a constant current, and the constant current value is changed by data of continuous m bits in a signal obtained by superimposing the spread code onto the signal to be transmitted, wherein said m is a nonnegative integer.

5. The signal transmission method according to claim 1, further comprising controlling a first DC-DC converter based upon the first and second signals.

6. The signal transmission method according to claim 5, wherein a second DC-DC converter is connected to the output line of the switching power supply, and the first and second signals are used to control the second DC-DC converter.

7. The signal transmission method according to claim 1, further comprising transmitting a synchronization signal on a signal line different from the output line of the switching power supply, the synchronization signal operable to synchronize the second signal superimposed onto the output line of the switching power supply.

* * * * *